(12) United States Patent
Xian et al.

(10) Patent No.: US 11,272,571 B2
(45) Date of Patent: *Mar. 8, 2022

(54) TWO STAGE ROLE SWITCH FOR FULLY WIRELESS EARBUDS

(71) Applicant: Google LLC, Mountain View, CA (US)

(72) Inventors: Shijing Xian, Sunnyvale, CA (US); Guang Xie, San Jose, CA (US); Jeffrey Kuramoto, Mountain View, CA (US)

(73) Assignee: Google LLC, Mountain View, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/804,506

(22) Filed: Feb. 28, 2020

(65) Prior Publication Data
US 2020/0205227 A1   Jun. 25, 2020

Related U.S. Application Data

(63) Continuation of application No. 16/168,474, filed on Oct. 23, 2018, now Pat. No. 10,631,363.

(51) Int. Cl.
*H04W 84/20* (2009.01)
*H04M 1/60* (2006.01)
(Continued)

(52) U.S. Cl.
CPC ......... *H04W 84/20* (2013.01); *H04M 1/6066* (2013.01); *H04N 21/44004* (2013.01); *H04R 1/1016* (2013.01)

(58) Field of Classification Search
CPC ................ H04W 84/20; H04M 1/6066; H04N 21/44004; H04R 1/1016
(Continued)

(56) References Cited

U.S. PATENT DOCUMENTS

| 9,924,010 B2 | 3/2018 | Watson et al. |
| 10,085,216 B1 | 9/2018 | Younis |

(Continued)

FOREIGN PATENT DOCUMENTS

CN   107950014 A   4/2018

OTHER PUBLICATIONS

International Search Report and Written Opinion for International Application No. PCT/US2019/057613 dated Feb. 12, 2020. 13 pages.

(Continued)

*Primary Examiner* — Peter G Solinsky
(74) *Attorney, Agent, or Firm* — Lerner, David, Littenberg, Krumholz & Mentlik, LLP

(57) ABSTRACT

The present disclosure provides for role switch with perceptible continuity of audio streaming during the role switch. The role switch occurs in two stages, with a first stage including a host link role switch and a second stage including a relay link role switch. For example, the host link role switch concerns the relationship of each audio receiver device to the host device, where the master device receives audio directly from the host for relay to the slave. The relay link role switch concerns a relationship between the audio receiver devices. For example, the communication master controls timing, such as when to send packets between the master and slave devices. Each stage of the two stage procedure may take approximately 100 ms or less. Between each stage, the audio buffers of the master and slave devices have an opportunity to refill.

20 Claims, 8 Drawing Sheets

(51) Int. Cl.
*H04N 21/44* (2011.01)
*H04R 1/10* (2006.01)

(58) Field of Classification Search
USPC .......................................................... 370/294
See application file for complete search history.

(56) References Cited

U.S. PATENT DOCUMENTS

| | | |
|---|---|---|
| 10,631,363 B1 * | 4/2020 | Xian .................... H04R 1/1016 |
| 2013/0316642 A1 | 11/2013 | Newham |
| 2016/0219358 A1 | 7/2016 | Shaffer et al. |
| 2017/0094389 A1 | 3/2017 | Saulsbury et al. |
| 2017/0311105 A1 | 10/2017 | Hariharan et al. |
| 2018/0199282 A1 | 7/2018 | Newham |
| 2019/0230459 A1 | 7/2019 | Sridharan et al. |

OTHER PUBLICATIONS

International Preliminary Report on Patentability for International Application No. PCT/US2019/057613 dated May 6, 2021. 8 pages.
First Examination Report for Indian Patent Application No. 202047046291 dated Sep. 9, 2021. 6 pages.
Office Action for Korean Patent Application No. 10-2020-7032595 dated Oct. 15, 2021. 6 pages.
Office Action for Japanese Patent Application No. 2020-565874 dated Dec. 21, 2021. 3 pages.

* cited by examiner

TWO STAGE ROLE SWITCH FOR FULLY WIRELESS EARBUDS

CROSS-REFERENCE TO RELATED APPLICATIONS

The present application is a continuation of U.S. patent application Ser. No. 16/168,474, filed Oct. 23, 2018, the disclosure of which is incorporated herein by reference.

BACKGROUND

Full wireless earbuds are two earbuds that connect to each other wirelessly. Typically such full wireless earbuds follow a relay format or a sniff format. In the relay format, one earbud serves a master role, and the other earbud serves a slave role. The master earbud receives audio from a host, e.g., a mobile phone or other audio playback device, then relays the audio to the slave earbud. In the sniff format, one earbud is a primary earbud, and the other earbud is a secondary earbud. The primary earbud receives and acknowledges audio packets from the host, while the secondary earbud only receives audio, or "sniffs," but never acknowledges the packet. If the secondary earbud loses packets, it will ask the primary earbud to re-transmit the packets.

Role switch between two earbuds happens when the roles of earbuds change. For example, for relay format earbuds, the master becomes the slave, and the slave becomes the master. For sniff format earbuds, the primary earbud becomes secondary, and the secondary earbud becomes primary. Role switch can happen if, for example, the slave earbud has better received signal strength, if the master earbud is running on lower battery than the slave, if the master earbud is taken out of the user's ear or put in a case, etc.

Wireless earbuds in relay format typically have a first asynchronous connection-less (ACL) link between the host device and the master earbud, where the master earbud is a Bluetooth slave in this ACL link. A second ACL link exists between the master earbud and the slave earbud. In this second ACL, the master earbud is the Bluetooth master, and the slave earbud is the Bluetooth slave.

In this format, it is very difficult to achieve seamless role switch. For example, most, if not all, profiles in the ACL between the master earbud and the host device need to be transferred to the slave earbud silently, so that after role switch the new master earbud can continue receiving audio packets. Further, a Bluetooth role switch is also required as the old master earbud becomes the new slave earbud, while the old slave earbud becomes new master earbud, because the master earbud should also be the Bluetooth master to be efficient at Bluetooth transmission.

BRIEF SUMMARY

A solution is provided to make the role switch of fully wireless earbuds in relay format "seamless." As such, no audio glitch is perceptible when the role switch occurs.

One aspect of the disclosure provides a method for performing role switch between a first device operating as a master and a second device operating as a slave. The method includes receiving, by the first device, packets from a host device, forwarding the received packets from the first device to the second device, increasing a central processing unit (CPU) clock rate in each of the first device and the second device, performing a first stage role switch and performing a second stage role switch. The first stage role switch includes establishing a communication link between the second device and the host device, and notifying the host device that the second device is operating as a new master. Between the first and second stage, the second device receives packets from the host device and forwards the received packets from the second device to the first device according to a preset schedule. When audio buffers of the first device and the second device reach a predetermined level, the second stage role switch is performed at the first and second devices. The second stage role switch includes passing, from the first device to the second device, control of timing for sending packets from the second device as the new master to the first device as the new slave. When the second stage is complete, the CPU clock rates in the first and second devices may be reduced.

Another aspect of the disclosure provides a system, including a first audio receiver device adapted to operate in a master role and a slave role, and a second audio receiver device adapted to operate in a master role and a slave role. Each of the first and second audio receiver devices include a wireless communication interface adapted to receive audio packets over a wireless connection, an audio buffer adapted to temporarily store the received audio packets, a speaker adapted to playback the audio packets temporarily stored in the audio buffer, and a processor in communication with the wireless communication interface. The processor may be configured to execute a two-stage role switch operation, including receiving, by the first device, packets from a host device, forwarding the received packets from the first device to the second device, increasing a central processing unit (CPU) clock rate in each of the first device and the second device, performing a first stage role switch at the first and second devices, the first stage role switch including establishing a communication link between the second device and the host device and notifying the host device that the second device is operating as a new master. The processor may be further configured to receive, by the second device, packets from the host device, forwarding the received packets from the second device to the first device according to a preset schedule, when audio buffers of the first device and the second device reach a predetermined level, perform a second stage role switch at the first and second devices, the second stage role switch comprising passing, from the first device to the second device, control of timing for sending packets from the second device as the new master to the first device as the new slave, and decrease the CPU clock rates in the first and second devices.

Yet another aspect of the disclosure provides a system, including a first audio receiver device and a second audio receiver device adapted to wirelessly pair with the first audio receiver device. The first audio receiver device and second audio receiver device are configured to perform a two stage role switch operation, including receiving, by the first device, packets from a host device, forwarding the received packets from the first device to the second device, increasing a central processing unit (CPU) clock rate in each of the first device and the second device, performing a first stage role switch at the first and second devices, the first stage role switch including establishing a communication link between the second device and the host device and notifying the host device that the second device is operating as a new master, receiving, by the second device, packets from the host device, forwarding the received packets from the second device to the first device according to a preset schedule, when audio buffers of the first device and the second device reach a predetermined level, performing a second stage role switch at the first and second devices, the second stage role switch comprising passing, from the first device to the second device, control of timing for sending packets from the second device as the new master to the first device as the new slave, and decreasing the CPU clock rates in the first and second devices.

DETAILED DESCRIPTION

Figure 1:
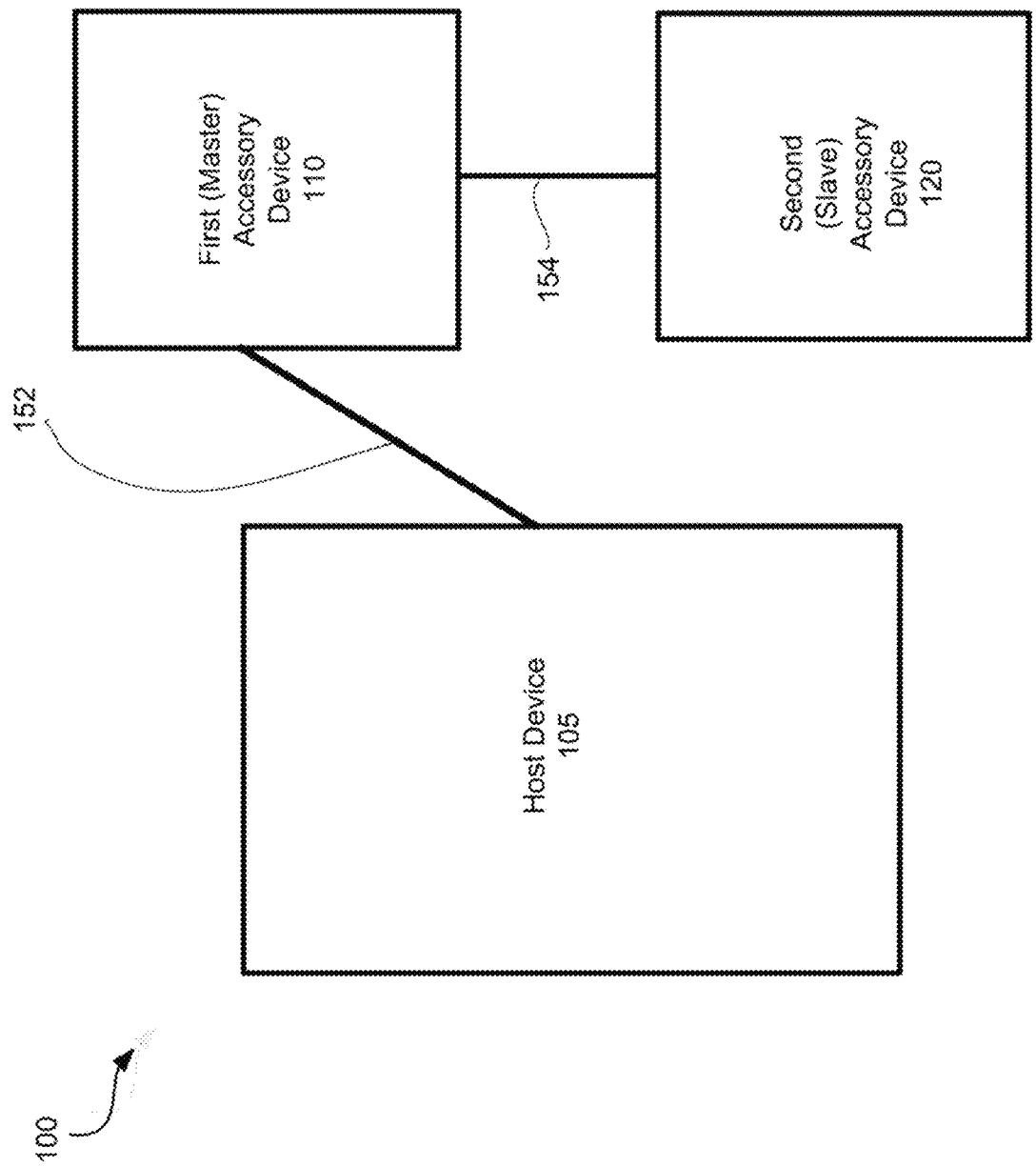
FIG. 1 is a block diagram illustrating an example system according to aspects of the disclosure.

The present disclosure provides for role switch with perceptible continuity of audio streaming during the role switch. The role switch occurs in two stages, with a first stage including a host link role switch and a second stage including a relay link role switch. For example, the host link role switch concerns the relationship of each audio receiver device to the host device, where the master device receives audio directly from the host for relay to the slave. The relay link role switch concerns a relationship between the audio receiver devices. For example, the communication master controls timing, such as when to send packets between the master and slave devices. Each stage of the two stage procedure may take approximately 100 ms, or more or less. Between each stage, the audio buffers of the master and slave devices have an opportunity to refill. While the procedure is primarily described herein with respect to earbuds, it should be understood that the procedure may also be applied to any other wirelessly paired devices having master and slave roles.

A first device in a master role receives audio from a host device, such as a mobile phone, over a communication link, such as an asynchronous communication less (ACL) link, between the first device and the host. The first device relays the audio to a second device in a slave role. The first and second devices may switch master/slave roles in certain instances, such as if the master is suffering from interference while the slave has good signal strength with the host. Before role switch, both the first and second devices increase their internal clock rates. For example, the first and second devices may set their central processing unit (CPU) clock rates to a maximum setting. Moreover, the devices may reduce a polling rate at which the first device in the master role tries to send packets to the second device in the slave role. For example, the devices may reduce this rate to approximately 2.5 ms.

The first device in the master role starts sending role switch information, such as Bluetooth profiles, to the second device. During this process, the first device continues receiving audio from the host device and relaying the audio to the second device. The second device continues its normal operation.

The first and second devices begin the host link role switch. The host link role switch may begin in a communication controller of the devices, such as a Bluetooth controller. The first device may poll the buffers from its controller, and relay the audio buffer to the second device in the slave role. The first device may stop receiving audio packets from the host, such as by turning off a flow bit, changing an access address at the controller, or performing any of a number of other tasks to achieve the result of packets not being received by the first device. The host link role switch is completed at the controller. For example, the second device may take over the communication link between the first device and the host, and may notify the host that the second device is the new master. In some examples, the first device may receive confirmation from the second device that it successfully established the communication link, and the first device may notify the host that it is the new slave. The first and second devices, as new slave and new master respectively, recreate their internal Bluetooth host profiles. For example, the devices can reconstruct memories of their internal Bluetooth profiles and states.

After the host link role switch, the second device serving as the new host link master is still a Bluetooth slave to the host device and to the first device. The host device sends audio packets to the second device in the new master role. Since the second device is still the relay link slave to the first device, special scheduling may be set at the Bluetooth controller and used to relay the received audio packets from the second device to the first device. For example, the special scheduling may provide an indication to the first device of when to expect to receive packets. Such relay of packets using the special scheduling may continue until the audio buffers of the first and second devices reach predetermined levels. For example, it may continue until the audio buffers reach a "normal" range of approximately 150 ms-250 ms or more.

Once the audio buffers reach the predetermined levels, the first and second devices trigger the relay link role switch. Accordingly, the second device serving in the new host link master role also becomes the new relay link master, and controls the timing of packet transmission between the first device and the second device. The first device serving as the new device slave also becomes the new relay link slave. The CPU clock rates and polling time may be returned to their previous values before they were altered for the two stage role switch procedure.

Performing the two stage role switch in this manner provides for seamless role switch for the relay solution. This helps to improve audio quality, such as in situations where the slave earbud has better connectivity than the master earbud. It also helps to improve battery life. For example, the master earbud may consume more power than the slave earbud. Accordingly, by switching roles, the devices can shift the burden to extend the usage time of both devices. In further examples, role switch can be performed when one bud becomes absent, such as if one earbud is taken out of the user's ear, or put in a case, etc. Because the role switch is seamless, these benefits can be achieved without a noticeable impact on audio quality, thereby providing an improved user experience.

FIG. 1 illustrates an example system 100 including a host device 105 communicatively coupled to master accessory device 110. The master accessory device 110 may be one of a pair of accessory devices, such as earbuds, wireless speakers, etc. As such, the master device 110 is further communicatively coupled to slave accessory device 120. While only one slave device 120 is shown in FIG. 1, it should be understood that multiple slave devices may be communicatively coupled with the master device 110.

The connection between the devices 105, 110, 120 may be, for example, short range wireless pairing, such as Bluetooth. For example, host device 105 may be coupled to master device 110 via a host communication link 152, such as first ACL link. The master device 110 may be coupled to slave device 120 via a relay communication link 154, such as second ACL link.

Figure 2:
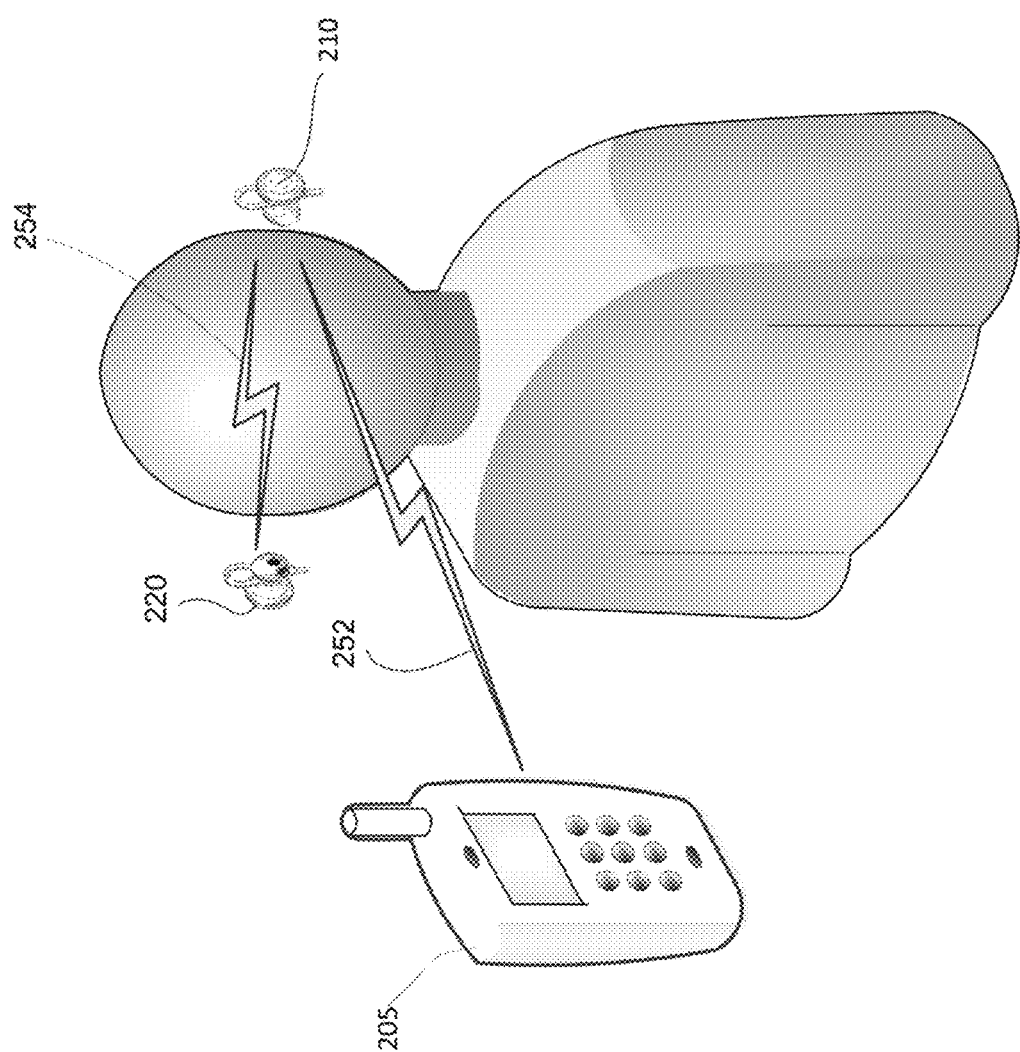
FIG. 2 is an example pictorial diagram of the system of FIG. 1.

FIG. 2 illustrates an example of the system of FIG. 1, wherein the host device is a mobile phone 205, the master accessory is a first earbud 210, and the slave accessory is a second earbud 220. Host communication link 252 which exists between the phone 205 and the first earbud 210, while relay communication link 254 exists between the first earbud 210 and the second earbud 220.

While the host device in this example is illustrated as a mobile phone, it should be understood that the host device may be any of various types of devices adapted to transmit audio signals. For example, the host device may be a tablet, smart watch, game system, music player, laptop, personal digital assistant device, or any other computing device. Similarly, the first and second accessories, while here shown as earbuds 210, 220, may in other examples be any combination of speakers or other audio devices, video output displays, etc. The first and second accessories may be paired during a time of manufacture, or may be sold separately and paired later by a user.

In some instances, it may be desirable for the first and second accessories to switch roles. For example, the earbud serving in the master role may have a lower quality signal strength connection with the host as compared to a possible connection between the host and the device in the slave role. An example of such conditions is illustrated in FIG. 2. The first earbud 210 is subject to cross-body interference with respect to the host device 105, because the host device 105 is being held on an opposite side of the user's body. The second earbud 220, in contrast, is on a same side of the user's body as the host device 105. Accordingly, the second earbud 220 is subject to less cross-body interference than the first earbud 210.

Another example of when it may be desirable to switch master/slave roles relates to battery levels of the first and second devices. The device serving in the master role may consume more power than the device serving in the slave role. Accordingly, when a battery of the master device drains to a predetermined level, for example, it may be desirable to switch roles with the slave device.

In order to switch roles, a two-stage procedure may be used. For example, in a first stage, role switch with respect to the host device may occur, such that a new host link master establishes a communication link with the host. In the second stage, role switch with respect to the playback devices may occur, such that the new relay link master controls timing of transmission of packets over a relay link between the playback devices. In this two-stage procedure, any gaps in audio transmission and playback may be short enough that they are not perceived by the user. For example, each stage of the two-stage procedure may be completed within approximately 100 ms, such that any gaps are approximately 100 ms or less.

FIGS. 3A-3F illustrate an examples of the two-stage role switch procedure. While the figures illustrate several operations of the role switch procedure, it should be understood that additional operations may be performed.

Figure 3A:
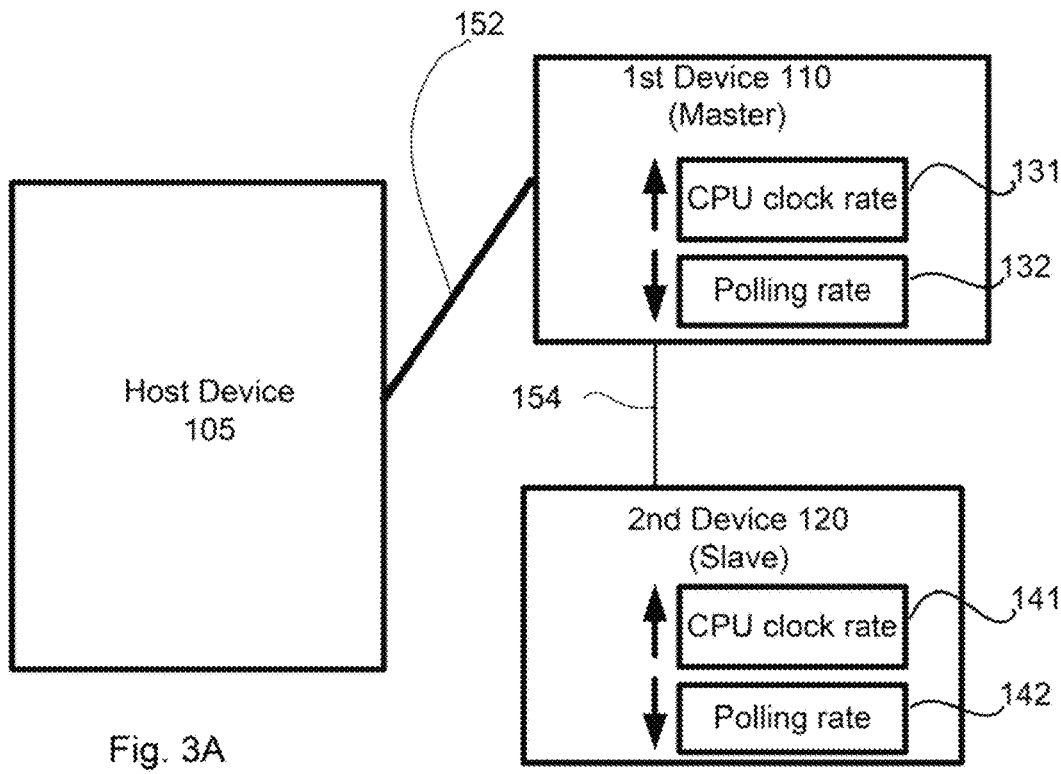
FIGS. 3A-F are block diagrams illustrating role switching according to aspects of the disclosure.

In FIG. 3A, the first and second devices 110, 120 increase a rate of their internal CPU clocks 131, 141, respectively. For example, the first and second devices 110, 120 may increase the clock rates to a maximum possible rate. The clock rates may vary based on supporting chipsets. By increasing the CPU clock rate, operations that are limited by CPU speed will be sped up proportionately with the CPU clock rate increase. For example, operations such as saving a profile state on the master device, or restoring profiles on the slave device, may be performed more quickly at increased CPU clock rates than at unadjusted CPU clock rates.

The first and second devices 110, 120 may also reduce a polling time 132, 142. For example, the devices may reduce a tPoll timeat which the master device 110 sends packets to the slave device 120. By adjusting the polling timein this manner, Bluetooth packets will be sent faster from the second device to the first device. Any time a packet is sent from a Bluetooth slave to a Bluetooth master, there will be a random delay up to the value of tPoll, such as approximately 25 ms by default. Reducing the tPoll time can dramatically decrease an amount of time for the second stage of the role switch. For example, during the second stage role switch the first and second devices negotiate a switch time and should both agree on the switch time before that time passes. By changing tPoll, the switch time can be set to an earlier time.

Figure 3B:
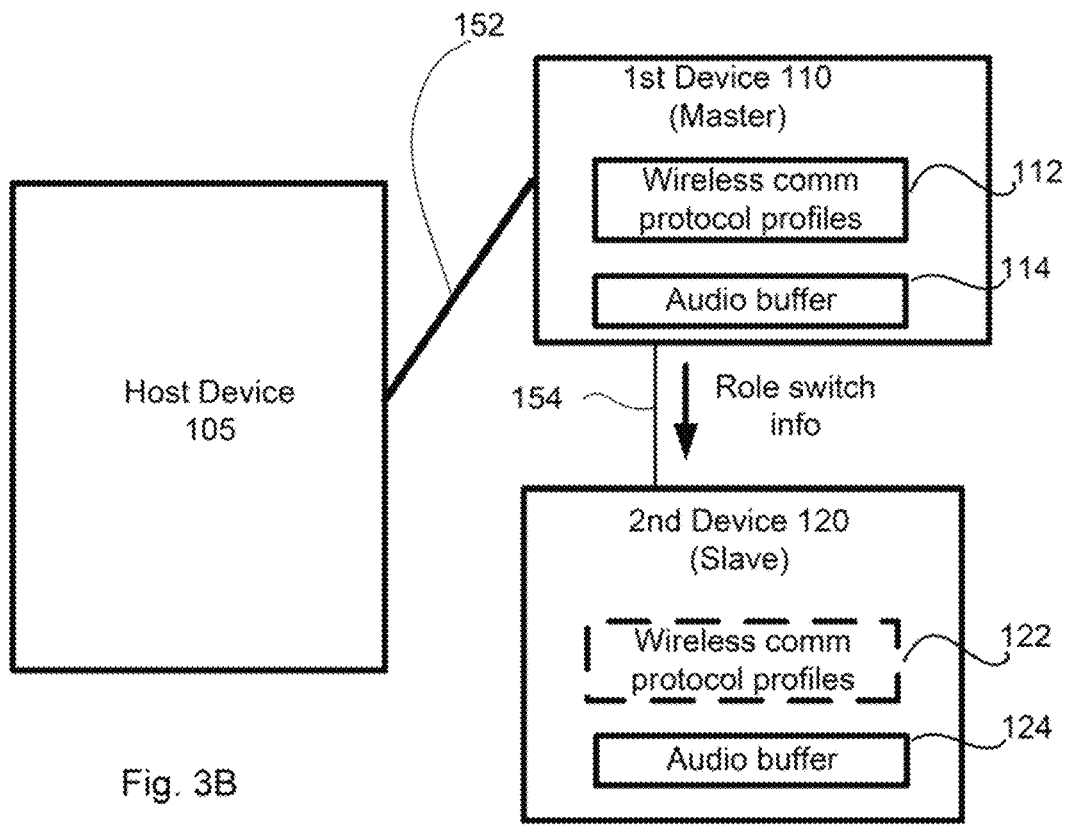

In FIG. 3B, the first device 110 starts sending role switch information to the second device 120. Such information may include, for example, wireless communication protocol profiles 112, such as Bluetooth profiles. Examples of such profiles include audio/video remote control profile (AVRCP), hands free profile (HFP), advanced audio distribution profile (A2DP), attribute profile (ATT), device ID profile (DIP), proximity profile (PXP), synchronization profile (SYNCH), radio frequency communication (RFCOMM), Bluetooth low energy (BLE), or the like. The profiles 112 may dictate how the master device 110 operates. For example, the profiles may contain information regarding dependencies on other formats, suggested user interface formats, parts of a protocol stack used by the profile, etc. In some examples, the profiles may determine how the master device 110 communicates with the host device 105. By way of example only, one or more of the profiles may be using communication link 152, such as an asynchronous communication less (ACL) link. In other examples, the profiles may define how audio is streamed from the host device 105 to the master device 110, and/or from the master device 110 to the slave device 120. The slave device 120 stores the received role switch information, such as wireless profiles 122. Other examples of role switch information may include, for example, ACL connection information, such as frequency hopping sequence, generic connection parameters, device identifiers. Further examples include device state independent of connection, such as logs, uptime, etc.

During the process of sending role switch information, the first device 110 may continue receiving audio packets from the host device 105 and relaying the audio packets to the second device 120 as it would in normal operation. Accordingly, the first device 110 may temporarily store the received audio packets in audio buffer 114. The second device 120 may also store the audio packets that it receives in audio buffer 124.

Figure 3C:
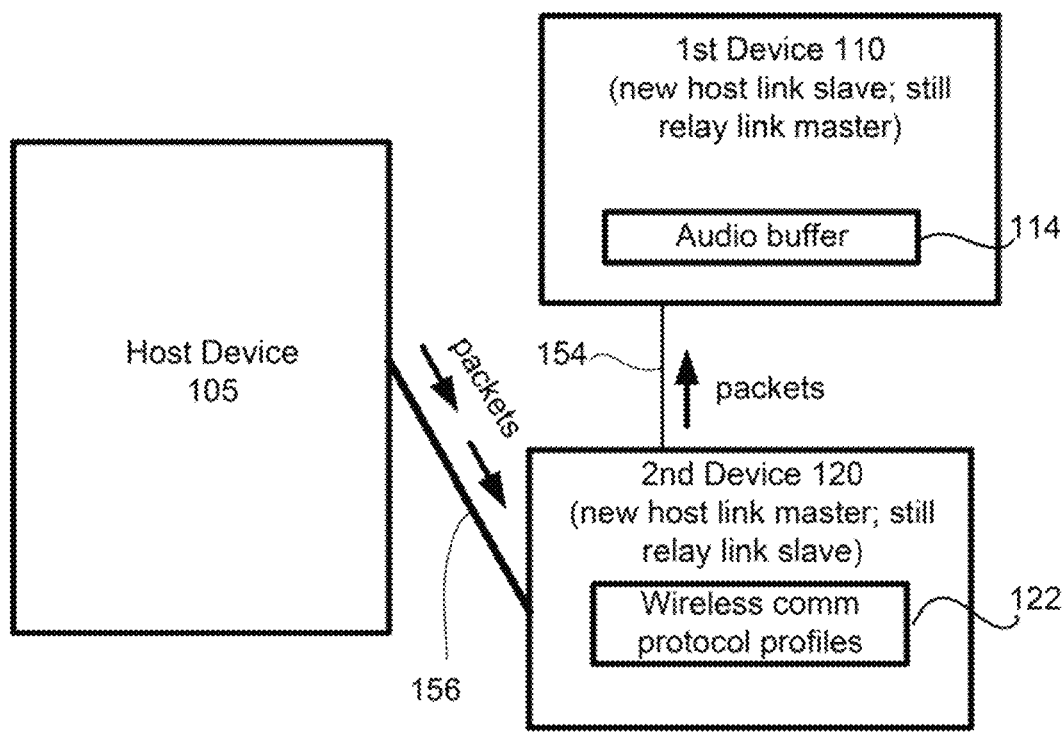

In FIG. 3C, the first and second devices 110, 120 perform a first stage of the role switch. In this first stage, the second device 120 establishes a link to the host device 105 and becomes the host link master. Accordingly, the second device 120 will receive packets from the host 105 for relay to the first device 110. However, the second device 120 is still a relay link slave to the first device 110, as will be discussed further in connection with FIG. 3D.

The first and second devices 110, 120 may begin the first stage role switch in their respective communication controllers, such as their Bluetooth controllers. For example, the first device 110 in the master role may poll all buffers from its controller and relay its audio buffer 114 to the second device 120. For example, any audio packets recently received by the first device 110, and stored in the buffer 114, may be transmitted to the second device 120 and stored in the slave buffer 124. In this regard, the second device 120 has the same buffer contents, and can begin playback of audio without delay upon switching to the role of master. While only audio packets in an audio buffer are shown in this example, it should be understood that other types of buffers, such as video or image buffers, may also be synced.

The first device 110 may then stop receiving audio packets from the host device 105. This can be done in any number of ways. By way of example only, the first device 110 may turn off a flow bit, change an access address at its communication controller, etc.

The first and second devices 110, 120 may then finish the first stage role switch. The second device 120 may establish a new communication link 156 with the host device 105, and notify the host device 105 that it is the new master that should receive packets directly from the host 105. According to some examples, the first and second devices 110, 120 may finish the first stage role switch at the communication controller layer, such as the Bluetooth controller layer. For example, each device 110, 120 may send a command to its communication controller to begin the first stage role switch. The first device 110 may send its link manager protocol (LMP) state to the second device 120, which receive the LMP socket. The second device 120 may start a new ACL link and sync with the host device 105. Once the ACL link is successfully established, the second device 120 may send a success LMP packet to the first device 110 and notify the host device 105 that the second device 120 is the new master. The first device 110, upon receipt of the LMP success packet, may also notify the host 105 that it is the new slave.

The first and second devices 110, 120, in their new slave and master roles, respectively, recreate their internal Bluetooth host profiles. This may be done very quickly. The first and second devices 110, 120 may reconstruct memories of their internal Bluetooth profiles and states. For example, the second device 120 as the new master may receive a struct from the first device 110, which was the previous master. The second device 120 may use the struct to recreate its Bluetooth profiles on the application side. The first device 110, as the new slave, may similarly receive a struct from the second device 120 and use the struct to recreate its Bluetooth profiles. While this is one example, it should be understood that other ways of recreating the internal Bluetooth profiles may be used.

During the first stage role switch, playback of the audio continues. Accordingly, because the first and second devices are not receiving packets from the host, audio buffers of the first and second devices will be drained. To prevent a perceivable glitch in the playback, the first stage role switch should be completed within a time that is less than a size of the audio buffer.

Having completed the first stage role switch, the second device 120 has set up the communication link 156 with the host device 105 and is serving as a slave to the host device 105. The second device 120 receives audio packets from the host device 105, which is trying to catch up the transmission. For example, the host device will keep buffering and trying to send packets, because audio is not paused and the host is not necessarily informed that a role switch is about to take place. In this regard, the transmission will catch up for the time period during which the first stage role switch occurred.

The second device 120, though completing the device role switch to become the device master, is still a relay link slave to the first device 110. For example, while the second device 120 took over the link with the host device, the second device 120 is still a slave on the link 154 with the first device 110. In this example, the first device 110 may still be the Bluetooth master in control of timing of sending packets. As such, it may be less efficient for the second device 120 to relay packets to the first device. To account for such inefficiencies, a special scheduling may be used for the packet relay.

Figure 3D:
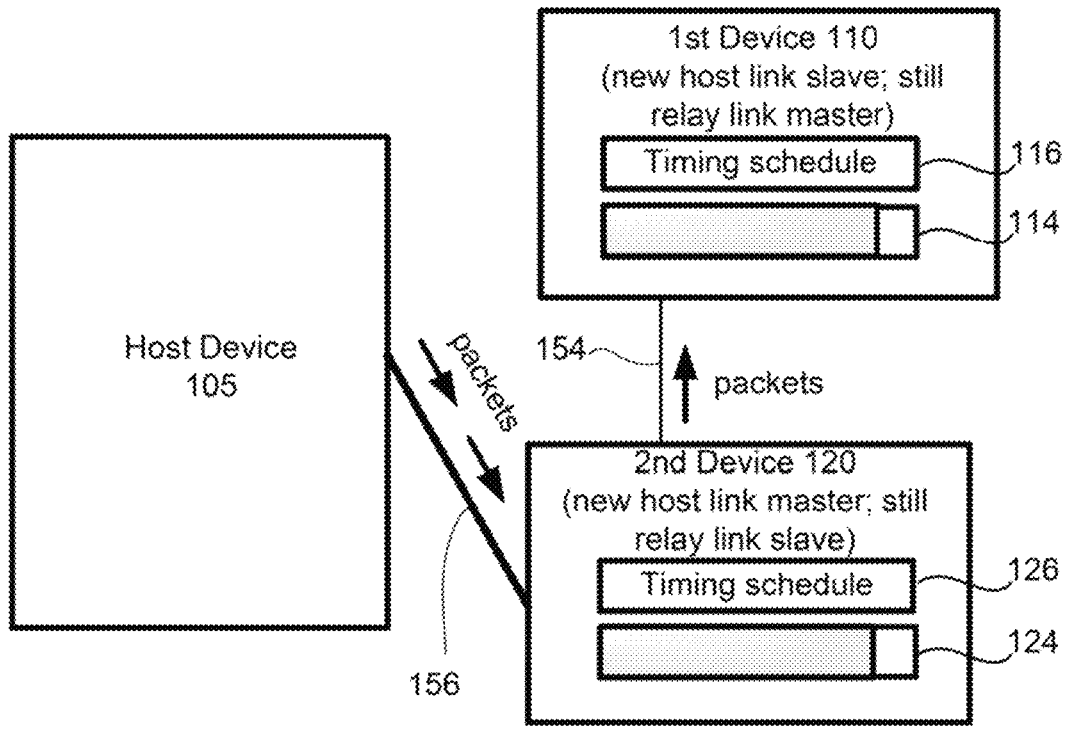

As shown in FIG. 3D, each of the first device 110 and the second device 120 store a special timing schedule 116, 126, respectively, for transmitting or receiving packets in a state when the first stage role switch has been completed but the second stage role switch has not. The timing schedules 116, 126 may be programmed for example, into a Bluetooth controller of each device 110, 120. The timing schedules 116, 126 may be preset at time of manufacture, and/or they may be updated by software or firmware updates provided through the host device 105. The timing schedules 116, 126 may provide for cohesion between the first and second devices 110, 120 by indicating when the second device 120 should transmit packets and when the first device 110 should expect to receive them. By way, of example, the timing schedules 116, 126 may indicate that the second device 120 in the new master role should send packets every 2 ms and that the first device 110 in the new slave role should listen for packets every 2 ms. It should be understood that this is merely an example, and that any timing scheme is possible.

The second device 120 may continue to relay packets from the host device 105 to the first device 110 according to the special timing schedules 116, 126 until the audio buffers 114, 124 at the first and second devices have caught up to a normal range. Prior to this point, the buffers were drained because audio playback was still occurring during the first stage role switch. For example, the audio buffers 114, 124 of the first and second devices may come into a range storing approximately 150 ms-250 ms, or more or less, of audio for playback. At this point, the first and second devices 110, 120 may trigger a second stage of the role switch.

Figure 3E:
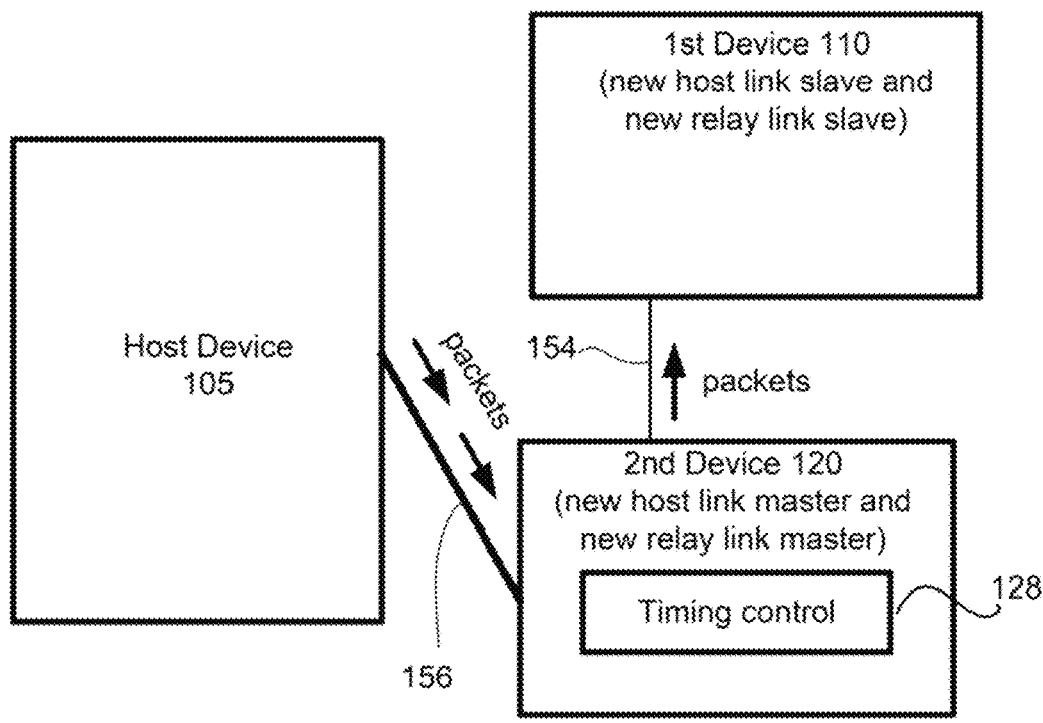

FIG. 3E illustrates a second stage of the role switch, where the second device 120 becomes master over the communication link 154 between the first device 110 and the second device 120. For example, the second device 120 sends a clock offset to the first device 110, a time to perform the switch is scheduled, and the switch occurs. During this stage, the second device 120 takes control of timing 128 for transmissions between the first device 110 and the second device 120. Because the audio buffers reached the normal range, no audio glitch should be heard during the second stage role switch.

Figure 3F:
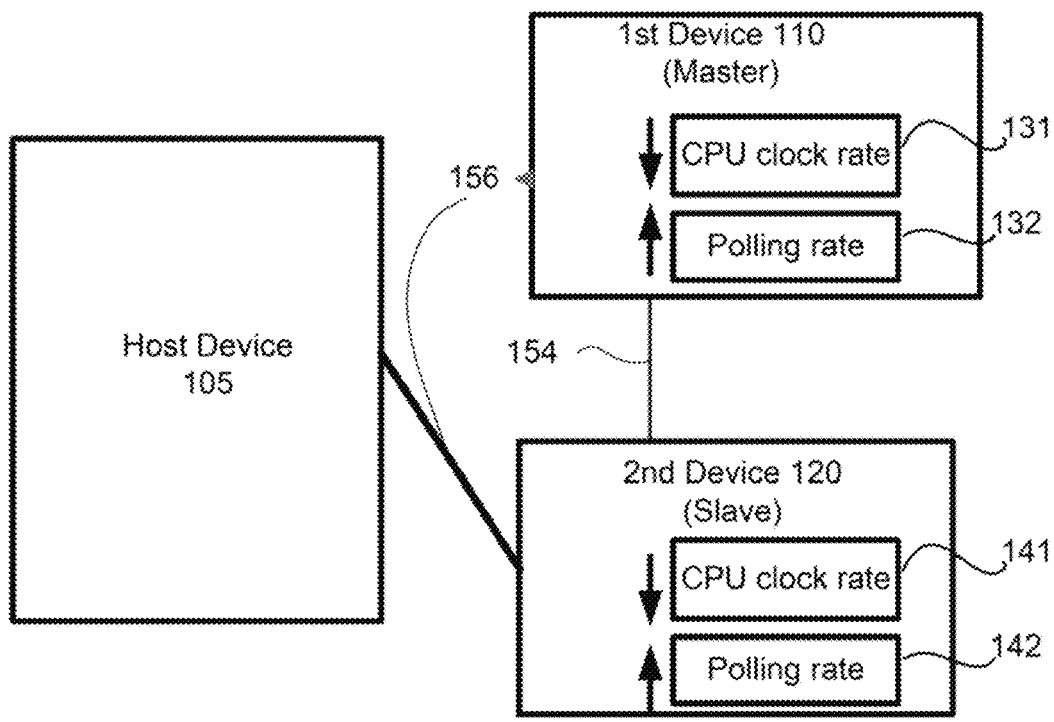

In FIG. 3F, the first and second devices 110, 120 return their internal timing to a previous setting. For example, the CPU clock rates 131, 141 that were previously increased are now returned to the pre-adjustment level. Further, the polling rates 132, 142 that were previously reduced are now returned to their pre-adjusted level. In some examples the pre-adjusted levels may be default levels or normal operating levels when the devices are not undergoing a role switch.

Figure 4:
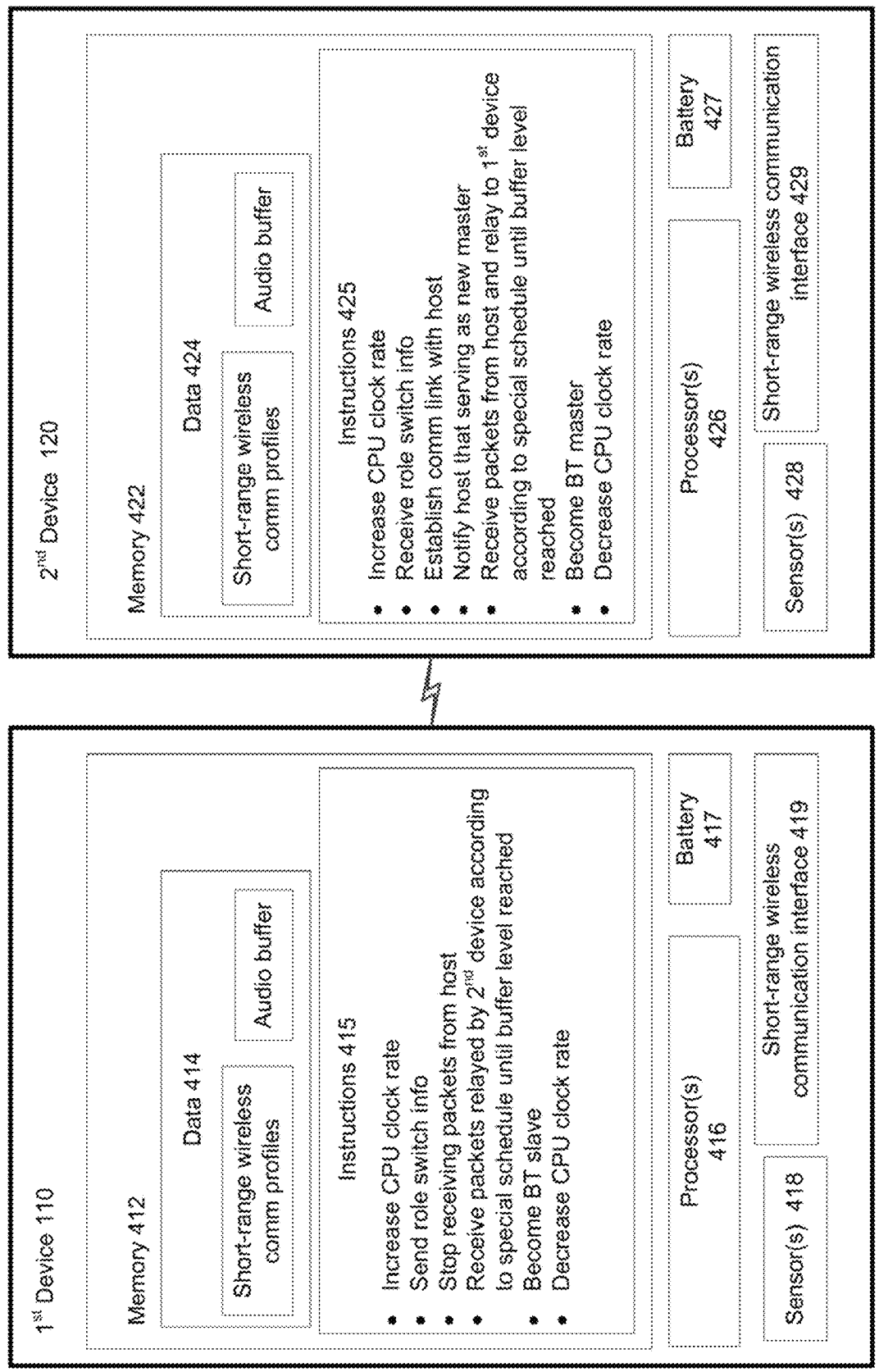
FIG. 4 is a functional block diagram illustrating an example system according to aspects of the disclosure.

FIG. 4 illustrates an example of internal components of the first device 110 and second device 120. While a number of internal components are shown, it should be understood that additional or fewer components may be included. By way of example only, the devices may include components typically found in playback devices, such as speakers, microphones, etc. The devices may be, for example, wireless accessories, such as earbuds, speakers, displays, etc. The devices are primarily described below with respect to the first device 110. While the second device 120 may be similar or identical to the first device 110 in some examples, in other examples the second device 120 may be a different type of device. Additionally or alternatively, the second device 120 may have different internal components.

The first device 110 may include one or more processors 416, one or more memories 412, as well as other components. For example, the computing device 110 may include one or more sensors 418, wireless pairing interface 419, and a battery 417.

The memory 412 may store information accessible by the one or more processors 416, including data 414 instructions 415 that may be executed or otherwise used by the one or more processors 416. For example, memory 412 may be of any type capable of storing information accessible by the processor(s), including a computing device-readable medium, or other medium that stores data that may be read with the aid of an electronic device, such as a volatile memory, non-volatile as well as other write-capable and read-only memories. By way of example only, memory 412 may be a static random-access memory (SRAM) configured to provide fast lookups. Systems and methods may include different combinations of the foregoing, whereby different portions of the instructions and data are stored on different types of media.

The data 414 may be retrieved, stored or modified by the one or more processors 416 in accordance with the instructions 415. For instance, data 414 may include short range wireless communication profiles, such as Bluetooth profiles. The data 414 may further include buffered packets, such as an audio buffer with packets received from a host device. Although the claimed subject matter is not limited by any particular data structure, the data may be stored in computing device registers, in a relational database as a table having a plurality of different fields and records, XML documents or flat files. The data may also be formatted in any computing device-readable format.

The instructions 415 may be any set of instructions to be executed directly (such as machine code) or indirectly (such as scripts) by the one or more processors 416. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 416 may be microprocessors, logic circuitry (e.g., logic gates, flip-flops, etc.) hard-wired into the device 110 itself, or may be a dedicated application specific integrated circuit (ASIC). It should be understood that the one or more processors 416 are not limited to hard-wired logic circuitry, but may also include any commercially available processing unit, or any hardware-based processors, such as a field programmable gate array (FPGA). In some examples, the one or more processors 416 may include a state machine. The processors 416 may be configured to execute the instruction 415 to, for example, perform a method such as described below in connection with FIGS. 5-6.

The processors 416 may include an internal clock, which controls a timing of operations of the first device 110. For example, the clock may control a timing of operations such as saving a profile state on the master device, or restoring profiles on the slave device.

The one or more sensors 418 may include any of a variety of mechanical or electromechanical sensors for detecting conditions relevant to a role switch. Such sensors may include, for example, an accelerometer, gyroscope, switch, light sensor, barometer, audio sensor (e.g., microphone), vibration sensor, heat sensor, radio frequency (RF) sensor, etc. In this regard, the device 110 may detect conditions indicating that the device should switch roles with its paired device. As one example, the sensors may detect received signal strength, and may compare the received signal strength to that of the paired device. The device 110 and its paired device may thus negotiate whether to switch roles. As another example, the sensors may detect other parameters, such as battery life, signal quality, movement, current buffer levels, etc.

The short range wireless pairing interface 419 may be used to form connections with other devices, such as paired second device 120 or a host device, such as a mobile phone providing the audio packets. The connection may be, for example, a Bluetooth connection or any other type of wireless pairing. By way of example only, each connection may include an ACL link.

Although FIG. 4 functionally illustrates the processor, memory, and other elements of device 110 as being within the same block, it will be understood by those of ordinary skill in the art that the processor and memory may actually include multiple processors and memories that may or may not be stored within the same physical housing. For example, memory 412 may be a volatile memory or other type of memory located in a casing different from that of computing device 110. Moreover, the various components described above may be part of one or more electronic devices.

In this example, the second device 120 has an internal architecture similar to that of the device 110. For example, the second device 120 includes a memory 422 storing data 424 and instructions 425 which may be executed by one or more processors 426. The second device 120 further includes a battery 427, sensors 428, a communication interface 429, such as a Bluetooth interface, etc. While the second device 120 is shown as executing a different set of instructions 425 than the instructions 41 of the first device 110, it should be understood that both devices 110, 120 may be programmed to perform role switch from master to slave and from slave to master.

As mentioned above, the instructions 415 and 425 may be executed to perform a two-stage role switch operation between the first device 110 and the second device 120. Both devices increase their internal CPU clock rates. The first device 110 sends role switch information to the second device 120. For example, the first device 110 may send its wireless communication profiles and its buffer contents to the second device 120. The first device 110 stops receiving packets from the host and the second device 120 establishes a communication link with the host. The second device 120 notifies the host that it is the new master and begins receiving packets, which it transmits to the first device 110 according to a special timing schedule. Once a predetermined buffer level is reached, the devices may perform second stage role switch, where the first device 110 becomes the slave and the second device 120 becomes the master over a connection between the devices. The device then return their clock rates to the previous settings.

Figure 5:
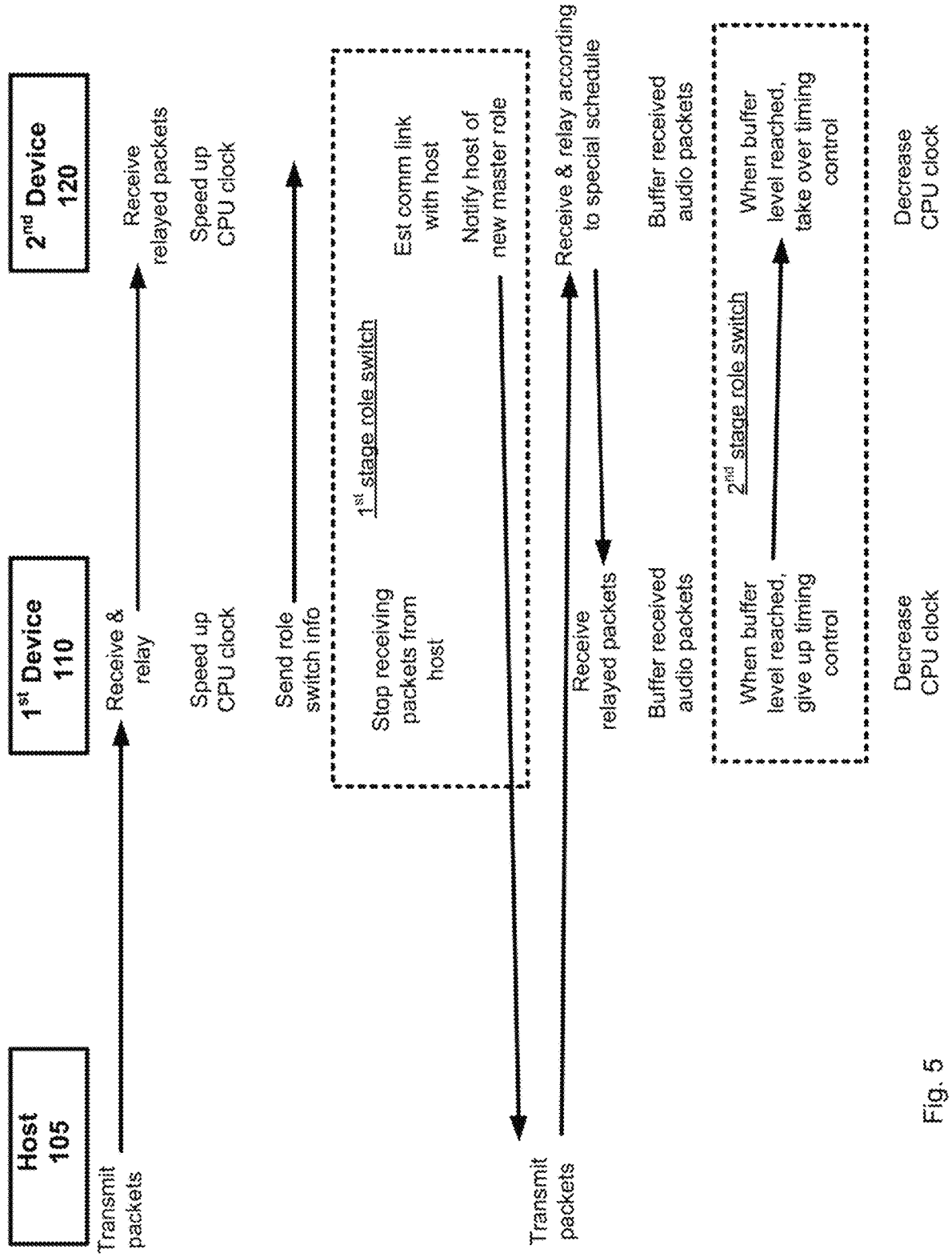
FIG. 5 is a timing diagram illustrating an example method according to aspects of the disclosure.

FIG. 5 provides an example timing diagram illustrating communications between devices before, during, and after the two-stage role switch. The host device transmits packets over a first short range wireless connection to the first device 110, which initially serves the master role. The first and second devices are wirelessly paired, and the first device 110 relays the received packets over a second short range wireless connection between the first device 110 and the second device 120. This may be a normal or default operation of the devices. It should be understood that the timing illustrated is merely an example, and that in other examples operations may overlap or occur in a different sequence.

When role switch is to be performed, the first and second devices speed up their internal CPU clocks, and the first device sends role switch information to the second device. Such role switch information may include wireless communication profiles, buffer contents, etc. While sending such role switch information, the first device 110 may continue receiving packets from the host device 105 as it normally would.

After sending the role switch information, the devices may perform a first stage of the role switch. In this stage, the first device stops receiving packets. The communication link between the host 105 and the first device 110 is broken down and the second device 120 establishes a new communication link with the host 105. The second device 120 may use this new communication link to notify the host 105 that it is the new master.

The second device 120 may therefore begin receiving packets directly from the host 105. After the first stage role switch, the second device is a Bluetooth slave to both the host and the first device, in that it listens for packets from the host 105 and is still configured to listen for packets from the first device 110. To overcome this, the second device 120 relays the packets received from the host 105 to the first device 110 according to a special schedule. Such special schedule may be stored in a communication controller of each of the first and second devices 110, 120.

The first and second devices 110, 120 continue to buffer the received audio packets. Once the buffers reach a predetermined level, the second stage role switch may be performed. The predetermined level may be, for example, a quantity of data for playback, such as data for 100 ms of playback, 300 ms of playback, etc. In other examples, the quantity of data may be measured in bits or any other unit.

During the second stage role switch the second device becomes the Bluetooth master over the communication link between the first device and the second device. As such, the second device 110 takes over timing control from the first device 110. Once the second stage role switch is complete, the devices return their CPU clocks to their pre-role switch settings.

Figure 6:
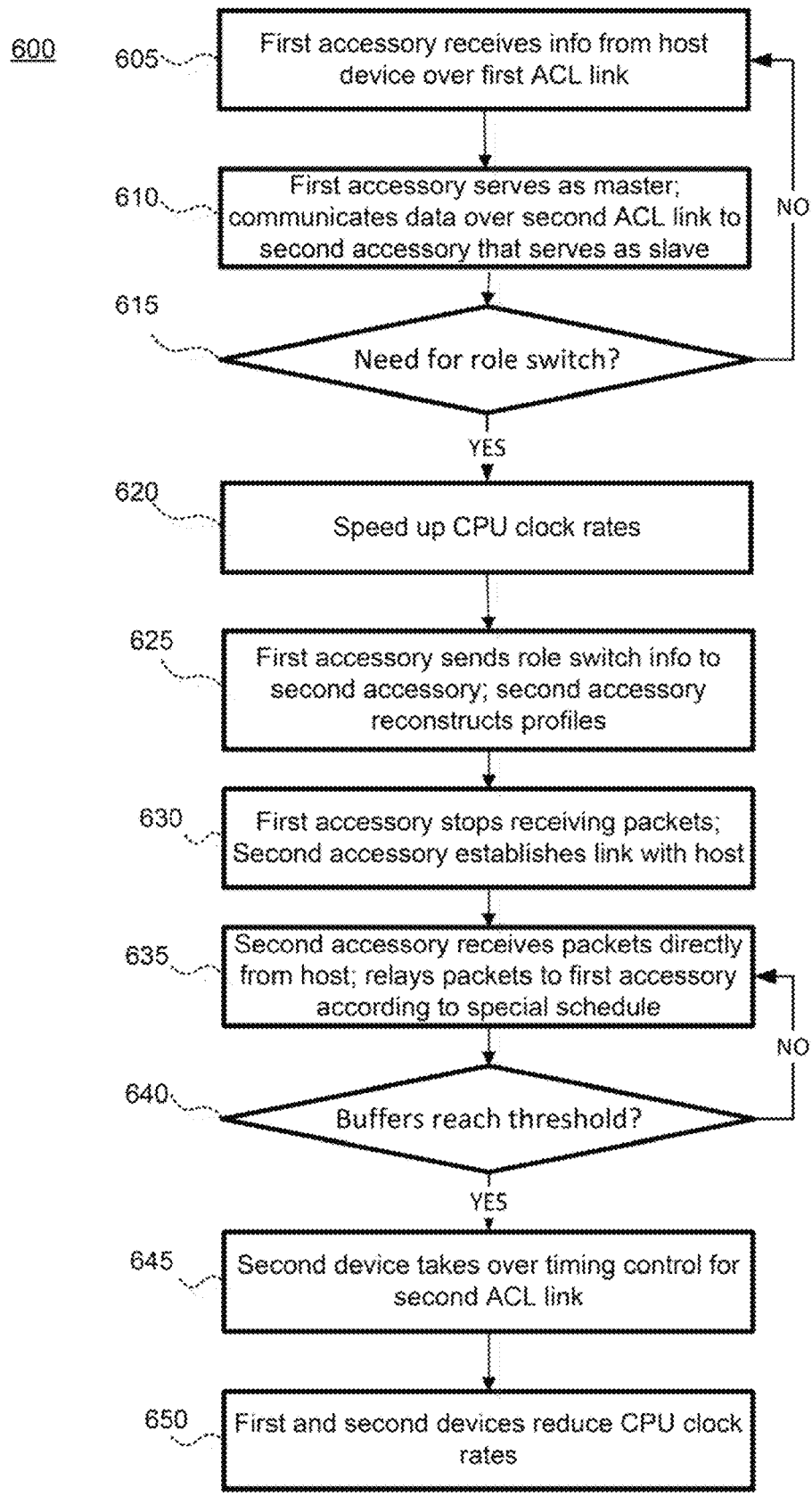
FIG. 6 is a flow diagram illustrating an example method according to aspects of the disclosure.

FIG. 6 is a flow diagram illustrating an example method 600 of a two-stage role switch between a first wireless accessory and a second wireless accessory. While the operations are illustrated and described in a particular order, it should be understood that the order may be modified and that operations may be added or omitted.

In block 605, the first accessory receives information from a host device over a first communication link. For example, the first accessory may receive audio packets from the host device over a first ACL link. The first accessory, serving as master, relays the received information to the second accessory of a second ACL link (block 610). Blocks 605 and 610 may be repeated until it is determined that a role switch is needed or beneficial in block 615.

When the role switch is to be performed, the first and second accessories speed up their internal CPU clocks in block 620. The accessories may further decrease their polling rates.

In block 625, the first accessory sends role switch information to the second accessory. Such role switch information may include Bluetooth profiles, buffer contents, or any other information the second accessory may need to serve as master and directly receive packets from the host device. The second accessory uses such information, for example, to reconstruct its Bluetooth profiles, update its buffer, etc.

In block 630 the first accessory stops receiving packets, and the second accessory establishes a link with the host. For example, the first accessory may relinquish the first ACL link, and the second accessory may establish a new ACL link with the host. The second accessory may then start receiving packets directly from the host and relaying such packets to the first accessory in block 635. Because at this point the second device has only completed a first stage of the role switch, the second device is still a Bluetooth slave to the first device over the second ACL link. For example, the first accessory is still in charge of timing for Bluetooth transmissions over the second ACL link, so the second device does not know when to send the relay packets. Accordingly, the first and second devices use a predetermined schedule for receiving/sending the relay packets.

The second device may continue receiving and relaying the packets to the first device according to the schedule until a buffer threshold is reached in block 640. For example, the threshold may be a predetermined amount of data for playback. Such amount may be set such that playback will not be perceivably delayed. Once the buffer reaches the threshold, the devices perform the second stage role switch, and the second accessory takes over timing control over the second ACL link (block 645). The first and second accessories, having completed the full role switch, may thus return to their previous clock speeds and polling rates.

The foregoing systems and methods are advantageous in that they provide for seamless role switch. For example, the role switch procedure may be performed without any audio glitches detected by the user. As such, role switching may be performed to maintain a high signal strength connection between the host and the master, or to prolong battery life of the devices, or for any other reason without sacrificing user experience.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for communication between a first device and a second device, the method comprising:

receiving, by the first device, packets from a host device;

forwarding the received packets from the first device to the second device;

increasing a central processing unit (CPU) clock rate in each of the first device and the second device;

receiving, by the second device, packets from the host device;

forwarding the received packets from the second device to the first device; and when audio buffers of the first device and the second device reach a predetermined level, passing, from the first device to the second device, control of timing for sending packets; and decreasing the CPU clock rates in the first and second devices.

2. The method of claim 1, further comprising:

reducing, prior to forwarding the received packets from the second device to the first device, a polling rate at which the first device sends packets to the second device;

increasing, after passing control of timing for sending packets, the polling rate at which the second device sends packets to the first device.

3. The method of claim 1, further comprising:

sending, by the first device, role switch information to the second device while continuing to receive packets from the host device.

4. The method of claim 1, wherein forwarding the received packets from the second device to the first device comprises forwarding according to a preset schedule.

5. The method of claim 4, wherein the preset schedule is programmed into a controller of the first device and a controller of the second device.

6. The method of claim 1, wherein increasing the CPU clock rate comprises setting the CPU clock to a maximum rate setting.

7. The method of claim 1, wherein the predetermined level for the audio buffers is 100-250 ms.

8. A system, comprising:

a first audio receiver device; and a second audio receiver device;

wherein each of the first and second audio receiver devices comprise:

a wireless communication interface adapted to receive audio packets over a wireless connection;

an audio buffer adapted to temporarily store the received audio packets;

a speaker adapted to playback the audio packets temporarily stored in the audio buffer; and a processor in communication with the wireless communication interface, the processor configured to execute communication between the first device and the second device, including:

receiving, by the first device, packets from a host device;

forwarding the received packets from the first device to the second device;

increasing a central processing unit (CPU) clock rate in each of the first device and the second device;

receiving, by the second device, packets from the host device;

forwarding the received packets from the second device to the first device; and when audio buffers of the first device and the second device reach a predetermined level, passing, from the first device to the second device, control of timing for sending packets; and decreasing the CPU clock rates in the first and second devices.

9. The system of claim 8, wherein the first and second devices are earbuds.

10. The system of claim 8, wherein the first and second devices are further configured to:

reduce, prior to forwarding the received packets from the second device to the first device, a polling rate at which the first device sends packets to the second device;

increase, after passing control of timing for sending packets, the polling rate at which the second device sends packets to the first device.

11. The system of claim 8, wherein the first device is further configured to send role switch information to the second device while continuing to receive packets from the host device.

12. The system of claim 8, wherein the first and second devices each further comprise a memory storing a preset schedule for forwarding the received packets from the second device to the first device.

13. The system of claim 8, wherein the first and second devices are further configured to increase the CPU clock rate comprises setting the CPU clock to a maximum rate setting.

14. The system of claim 8, wherein the predetermined level for the audio buffers is 100-250 ms.

15. A non-transitory computer-readable storage medium storing instructions executable by one or more processors for performing a method of communication between a first device and a second device, the method comprising:

when packets are received at the first device from a host device, forwarding the received packets from the first device to the second device;

increasing a central processing unit (CPU) clock rate in each of the first device and the second device;

receiving, by the second device, packets from the host device;

forwarding the received packets from the second device to the first device; and when audio buffers of the first device and the second device reach a predetermined level, passing, from the first device to the second device, control of timing for sending packets; and decreasing the CPU clock rates in the first and second devices.

16. The system of claim 15, wherein the first and second devices are further configured to:

reduce, prior to forwarding the received packets from the second device to the first device, a polling rate at which the first device sends packets to the second device; and increase, after passing control of timing for sending packets, the polling rate at which the second device sends packets to the first device.

17. The system of claim 15, wherein the first and second devices are further configured to:

send, by the first device, role switch information to the second device while continuing to receive packets from the host device.

18. The system of claim 15, wherein forwarding the received packets from the second device to the first device comprises forwarding according to a preset schedule, and wherein the preset schedule is programmed into a controller of the first device and a controller of the second device.

19. The system of claim 15, wherein increasing the CPU clock rate comprises setting the CPU clock to a maximum rate setting.

20. The system of claim 15, wherein the predetermined level for the audio buffers is 100-250 ms.